US012592188B2

(12) United States Patent
Chen

(10) Patent No.: US 12,592,188 B2
(45) Date of Patent: Mar. 31, 2026

(54) PIXEL CIRCUITS AND DISPLAY PANELS

(71) Applicant: Wuhan China Star Optoelectronics Semiconductor Display Technology Co., Ltd., Wuhan (CN)

(72) Inventor: Tao Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/254,869

(22) PCT Filed: Apr. 20, 2023

(86) PCT No.: PCT/CN2023/089496
§ 371 (c)(1),
(2) Date: May 29, 2023

(87) PCT Pub. No.: WO2024/178813
PCT Pub. Date: Sep. 6, 2024

(65) Prior Publication Data
US 2025/0372033 A1 Dec. 4, 2025

(30) Foreign Application Priority Data
Feb. 28, 2023 (CN) ......................... 202310195867.6

(51) Int. Cl.
*G09G 3/3258* (2016.01)
*G09G 3/32* (2016.01)
(Continued)

(52) U.S. Cl.
CPC ............ *G09G 3/3233* (2013.01); *G09G 3/32* (2013.01); *G09G 3/3266* (2013.01);
(Continued)

(58) Field of Classification Search
CPC ...... G09G 3/3233; G09G 3/32; G09G 3/3266; G09G 2300/0426; G09G 2310/0267;
(Continued)

(56) References Cited

U.S. PATENT DOCUMENTS

2017/0243542 A1 8/2017 Xiang et al.
2018/0130420 A1* 5/2018 Gao .................... G09G 3/3258
(Continued)

FOREIGN PATENT DOCUMENTS

CN 108564920 A 9/2018
CN 111754922 A 10/2020
(Continued)

OTHER PUBLICATIONS

Chinese Office Action issued in corresponding Chinese Patent Application No. 202310195867.6 dated Jan. 15, 2025, pp. 1-8.
(Continued)

*Primary Examiner* — Abdul-Samad A Adediran
(74) *Attorney, Agent, or Firm* — Nathan & Associates; Menachem Nathan

(57) ABSTRACT

A pixel circuit includes a first light-emitting control transistor, a driving transistor, a second light-emitting control transistor, and a light-emitting device. The number of times a source or a drain of the driving transistor is reset in one frame is configured to be larger than the number of times the anode of the light-emitting device is reset in the one frame.

17 Claims, 4 Drawing Sheets

(51) Int. Cl.
*G09G 3/3233* (2016.01)
*G09G 3/3266* (2016.01)

(52) U.S. Cl.
CPC ............... *G09G 2300/0426* (2013.01); *G09G 2310/0267* (2013.01); *G09G 2310/08* (2013.01); *G09G 2320/0233* (2013.01); *G09G 2320/0247* (2013.01); *G09G 2320/0271* (2013.01)

(58) Field of Classification Search
CPC ....... G09G 2310/08; G09G 2320/0233; G09G 2320/0247; G09G 2320/0271; G09G 3/3258
See application file for complete search history.

(56) References Cited

U.S. PATENT DOCUMENTS

| | | | |
|---|---|---|---|
| 2021/0407383 | A1 | 12/2021 | Lai et al. |
| 2021/0407386 | A1 | 12/2021 | Li et al. |
| 2022/0366830 | A1 | 11/2022 | Zhang et al. |

FOREIGN PATENT DOCUMENTS

| | | | |
|---|---|---|---|
| CN | 113012643 | A | 6/2021 |
| CN | 114758617 | A | 7/2022 |
| CN | 114758618 | A | 7/2022 |
| CN | 114974130 | A | 8/2022 |
| CN | 115148144 | A | 10/2022 |
| CN | 115410523 | A | 11/2022 |
| CN | 115602107 | A | 1/2023 |
| CN | 115662328 | A | 1/2023 |
| CN | 115662356 | A | 1/2023 |
| KR | 20210055146 | A | 5/2021 |
| WO | 2023011474 | A1 | 2/2023 |

OTHER PUBLICATIONS

A Chinese Journal of Electron Devices titled Design of Driving Circuit CMOS Camera Based on FPGA Technology issued on Apr. 20, 2009, pp. 1-6.

Korean Office Action issued in corresponding Korean Patent Application No. 10-2023-7041231 dated Sep. 30, 2024, pp. 1-6.

International Search Report in International application No. PCT/CN2023/089496,mailed on Nov. 17, 2023.

Written Opinion of the International Search Authority in International application No. PCT/CN2023/089496,mailed on Nov. 17, 2023.

* cited by examiner

PIXEL CIRCUITS AND DISPLAY PANELS

CROSS REFERENCE TO RELATED APPLICATIONS

This application is a National Phase of PCT Patent Application No. PCT/CN2023/089496 having international filing date of Apr. 20, 2023, which claims priority to and the benefit of Chinese Patent Application No. 202310195867.6 filed on Feb. 28, 2023. The contents of the above applications are all incorporated by reference as if fully set forth herein in their entirety.

TECHNICAL FIELD

The present disclosure relates to a field of manufacturing display panels, and more particularly, to pixel circuits and display panels.

BACKGROUND

Currently, in pixel circuits, reset frequencies of some nodes are also increasing in order to improve a flicker phenomenon at a low refresh frequency. However, as the reset frequency is increased, display uniformity at a low gray scale is deteriorated, which seriously affects the display quality.

SUMMARY

Technical Problem

The present disclosure provides pixel circuits and display panels to alleviate a technical problem that a flicker phenomenon at a low refresh frequency and uniformity at a low gray scale are difficult to be synchronously improved.

Technical Solution

According to a first aspect, the present disclosure provides a pixel circuit including a first light-emitting control transistor, a driving transistor, a second light-emitting control transistor, and a light-emitting device. One of a source or a drain of the first light-emitting control transistor is electrically connected to a first power supply line, one of a source or a drain of the driving transistor is electrically connected to another of the source or the drain of the first light-emitting control transistor, one of a source or a drain of the second light-emitting control transistor is electrically connected to another of the source or the drain of the driving transistor, an anode of the light-emitting device is electrically connected to another of the source or the drain of the second light-emitting control transistor, and a cathode of the light-emitting device is electrically connected to a second power supply line. The number of times the source or drain of the driving transistor is reset in one frame is greater than the number of times the anode of the light-emitting device is reset in the one frame.

In some embodiments, the pixel circuit further includes a first reset transistor and a bias transistor, one of a source or a drain of the first reset transistor is electrically connected to the anode of the light-emitting device, another of the source or the drain of the first reset transistor is electrically connected to a first reset line, gate of the first reset transistor is electrically connected to a first control line, one of a source or a drain of the bias transistor is electrically connected to the source or the drain of the driving transistor, another of the source or the drain of the bias transistor is electrically connected to a first wiring, and a gate of the bias transistor is electrically connected to a second wiring. The one frame includes at least one first period and at least one second period. During the at least one first period, both the first reset transistor and the bias transistor are turned on. During the at least one second period, the first reset transistor is turned off, and the bias transistor is turned on.

In some embodiments, the bias transistor is a second reset transistor, the first wiring is a second reset line, and the second wiring is a second control line; one of a source or a drain of the second reset transistor is electrically connected to the source or the drain of the driving transistor, another of the source or the drain of the second reset transistor is electrically connected to the second reset line, and a gate of the second reset transistor is electrically connected to the second control line. The number of times the second reset transistor is turned on in the one frame is greater than the number of times the first reset transistor is turned on in the one frame.

In some embodiments, the one frame includes a writing frame and a holding frame, the number of times the second reset transistor is turned on in the writing frame is greater than the number of times the first reset transistor is turned on in the writing frame, and the number of times the second reset transistor is turned on in the holding frame is greater than the number of times the first reset transistor is turned on in the holding frame.

In some embodiments, the first control line is configured to transmit a first control signal, and the second control line is configured to transmit a second control signal, the number of pulses of the second control signal in the one frame is greater than the number of pulses of the first control signal in the one frame.

In some embodiments, the one frame includes a writing frame and a holding frame, the number of pulses of the second control signal in the writing frame is greater than the number of pulses of the first control signal in the writing frame, and the number of pulses of the second control signal in the holding frame is greater than the number of pulses of the first control signal in the holding frame.

In some embodiments, the bias transistor is a writing transistor, the first wiring is a data line, and the second wiring is a third control line. One of a source or a drain of the writing transistor is electrically connected to the source or the drain of the driving transistor, another of the source or the drain of the writing transistor is electrically connected to the data line, and a gate of the writing transistor is electrically connected to the third control line. The number of times the writing transistor is turned on in the one frame is greater than the number of times the first reset transistor is turned on in the one frame.

In some embodiments, the one frame includes a writing frame and a holding frame, the number of times the writing transistor is turned on in the writing frame is greater than the number of times the first reset transistor is turned on in the writing frame, and the number of times the writing transistor is turned on in the holding frame is greater than the number of times the first reset transistor is turned on in the holding frame.

In some embodiments, the first control line is configured to transmit a first control signal, and the third control line is configured to transmit a third control signal, the number of pulses of the third control signal in the one frame is greater than the number of pulses of the first control signal in the one frame.

In some embodiments, the data line is configured to transmit a data signal, the one frame includes a writing frame and a holding frame, the number of pulses of the third control signal in the writing frame is greater than the number of pulses of the first control signal in the writing frame, the data signal includes at least one pulse in the writing frame; the number of pulses of the third control signal in the holding frame is greater than the number of pulses of the first control signal in the holding frame, and the number of pulses of the data signal in the holding frame is zero.

According to a second aspect, the present disclosure provides a display panel including a plurality of pixel circuits in at least one of above-described embodiments and at least two gate driving circuits. one of the at least two gate driving circuits outputs a first driving signal to control the source or the drain of the driving transistor to reset; another gate driving circuit of the at least two gate driving circuits outputs a second driving signal to control the anode of the light-emitting device to reset; and a frequency of the first driving signal is higher than a frequency of the second driving signal.

Beneficial Effect

According to the pixel circuit and the display panel provided in the present invention, by resetting a potential of a source or a drain of a driving transistor, a drift amplitude of a threshold voltage of the driving transistor may be reduced, thereby improving a flicker phenomenon at a low refresh frequency. At the same time, the number of times to reset the source or the drain of the driving transistor in one frame is larger than the number of times to reset the anode of the light-emitting device in one frame, so that the number of times to reset the anode of the light-emitting device may be reduced, the number of repetitive charging of the anode of the light-emitting device may be reduced, the problem of insufficient charging of the anode potential of the light-emitting device may be improved, and the uniformity at the low gray scale may be improved.

DETAILED DESCRIPTION

In order to make the objects, technical solutions, and effects of the present disclosure clearer and more explicit, the present disclosure will be described in further detail with reference to the accompanying drawings and embodiments below. It is to be understood that the specific embodiments described herein are merely illustrative of the disclosure and are not intended to limit the disclosure.

Furthermore, the terms "first", "second" are only for the purpose of description, and are not to be construed as indicating or implying relative importance or implicitly indicating the number of indicated technical features, such that the features defined by "first" and "second" may explicitly or implicitly include one or more of the recited features, and in the description of the present disclosure, "a plurality of" means two or more unless expressly and specifically defined otherwise.

Figure 1:
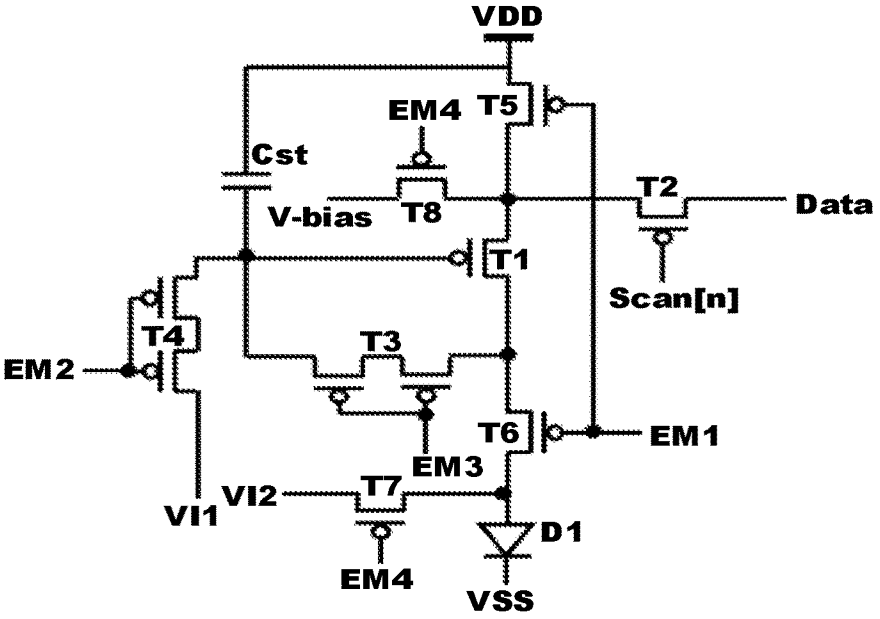
FIG. 1 is a schematic structural diagram of a pixel circuit in the related art.
Figure 2:
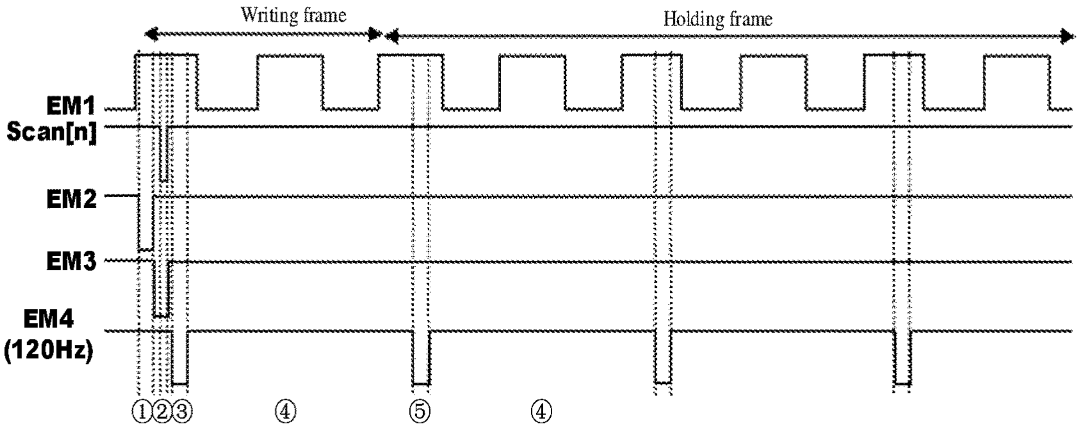
FIG. 2 is a timing diagram of the pixel circuit shown in FIG. 1.
Figure 3:
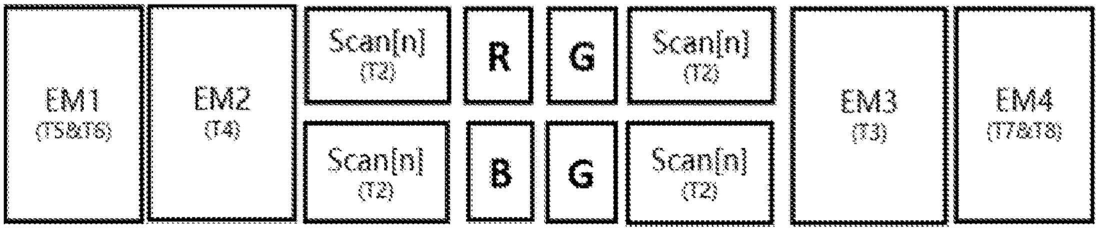
FIG. 3 is a schematic structural diagram of a display panel in which the pixel circuit shown in FIG. 1 is located.

Referring to FIGS. 1 to 3, FIG. 1 is a schematic structural diagram of a pixel circuit according to the related art. FIG. 2 is a timing diagram of the pixel circuit shown in FIG. 1. Thin film transistors in a self-emitting pixel circuit are mostly single low-temperature polysilicon thin film transistors (LTPS TFT) only or a combination of low-temperature polysilicon thin film transistor and metal oxide thin film transistors (low-temperature polysilicon and oxide, LTPO TFT), so as to drive the light-emitting device D1. A common design when driving at a low refresh frequency (40 Hz or less) is to apply a high-frequency bias voltage to a driving transistor T1 through a second reset transistor T8 and to reset an anode of a light-emitting device D1 through a first reset transistor T7, so that the flicker at a low frequency may be improved. Specifically, the driving process of the pixel circuit shown in FIG. 1 in one frame is shown in FIG. 2.

1). Writing Frame

At a stage ①, a control signal EM1 is at a high level, and a first light-emitting control transistor T5 and a second light-emitting control transistor T6 are turned off; a control signal EM2 is at a low level, a third reset transistor T4 is turned on, and a second initialization signal VI1 resets a potential of a gate of the driving transistor T1.

At a stage ②, a scanning signal Scan [n] is at a low level, and a writing transistor T2 is turned on; a control signal EM3 is at a low level, a compensation transistor T3 is turned on, and a data signal Data is written to the gate of the driving transistor T1 and a storage capacitor Cst.

At a stage ③, a control signal EM4 is at a low level, the first reset transistor T7 and a second reset transistor T8 are turned on, the anode of the light-emitting device D1 is reset by a first initialization signal VI2, and a bias voltage signal V-bias is applied to the source and drain of the driving transistor T1 for resetting, so that hysteresis of the driving transistor T1 may be improved, thereby improving the flicker occurring at the low frequency.

At a stage ④, the control signal EM1 is at a low level, the first light-emitting control transistor T5 and the second light-emitting control transistor T6 are turned on, and the light-emitting device D1 emits light.

2). Holding Frame

At a step ⑤, the control signal EM1 is at the high level, and the first light-emitting control transistor T5 and the second light-emitting control transistor T6 are turned off; the control signal EM4 is at the low level, the first reset transistor T7 and the second reset transistor T8 are turned on, and the first initialization signal VI2 is used to reset the anode of the light-emitting device D1, and the bias voltage signal V-bias is applied to the source and drain of the driving transistor T1 for resetting, so that the hysteresis of the driving transistor T1 may be improved, thereby improving flicker occurring at the low frequency.

It should be noted that the higher the frequency of the control signal EM4, the better the effect of improving the flicker. Since the gate of the first reset transistor T7 and the gate of the second reset transistor T8 share the control signal EM4 and are synchronously turned on or turned off, the reset frequency of the anode of the light-emitting device D1 increases as the frequency of the control signal EM4 increases, which deteriorates the display uniformity of the pixel circuit or the display panel at a low gray scale and reduces the display quality.

The inventors have found that the display uniformity at the low gray scale is strongly related to the charging process of the anode of the light-emitting device D1. The operation process of the light-emitting device D1 at the low gray scale is that the anode of the light-emitting device D1 is first reset to a low voltage, and then slowly charged to an operating voltage or a turn-on voltage, which affects the display uniformity at the low gray scale. If the reset frequency of the anode of the light-emitting device D1 is too high, the light-emitting device D1 is frequently in a reset-charging process, which causes the anode of the light-emitting device D1 to be undercharged and deteriorates display uniformity at the low gray scale.

FIG. 3 is a schematic structural diagram of a display panel in which the pixel circuit shown in FIG. 1 is located. The display panel includes a pixel circuit for red color (R) light emitting, a pixel circuit for green color (G) light emitting, and a pixel circuit for blue color (B) light emitting in a display area, which may be arranged in the display area in an array. The display panel also includes a plurality of gate driving circuits in a non-display area to provide various signals required for respective pixel circuits.

For example, a first gate driving circuit, a second gate driving circuit, a third gate driving circuit, and a fourth gate driving circuit may sequentially provide the control signal EM1, the control signal EM2, the control signal EM3, and the control signal EM4 to respective pixel circuits, respectively. A fifth gate driving circuit and a sixth gate driving circuit distributed on both sides of the display area may supply the same scanning signal Scan [n] to the same scanning line to improve the driving capability of the scanning signal Scan [n] by double-side driving.

Figure 4:
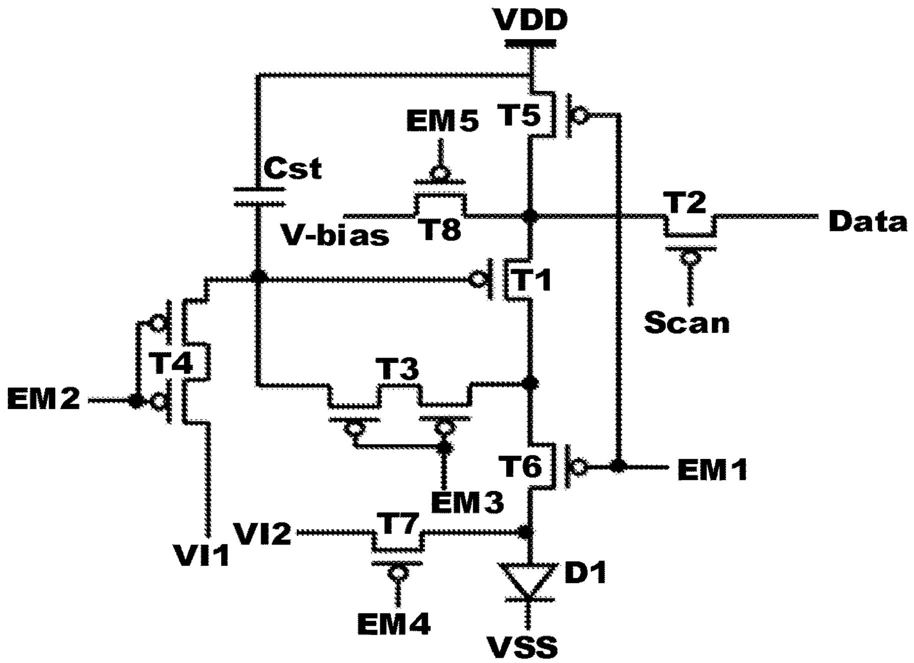
FIG. 4 is a schematic diagram of a first structure of a pixel circuit according to an embodiment of the present disclosure.
Figure 5:
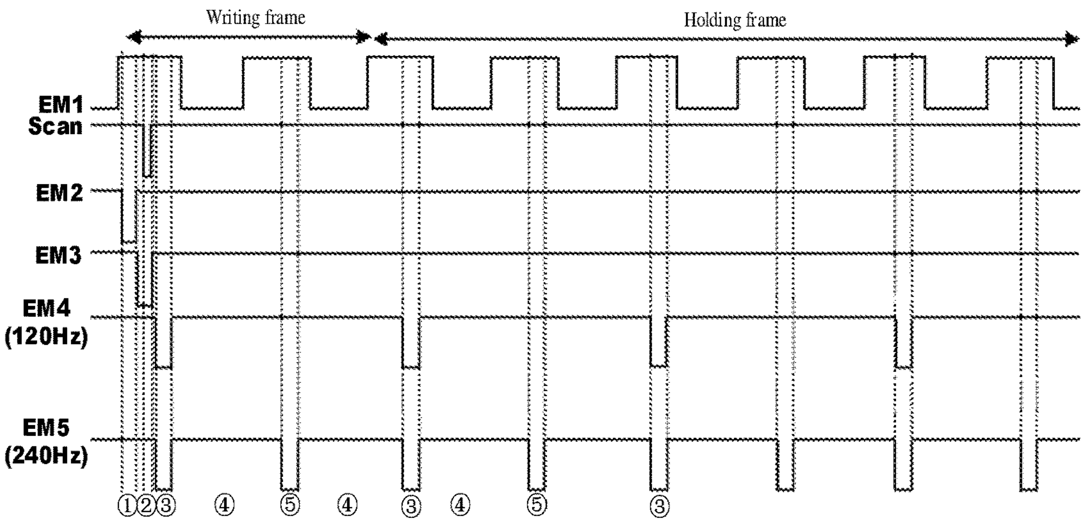
FIG. 5 is a timing diagram of the pixel circuit shown in FIG. 4.
Figure 6:
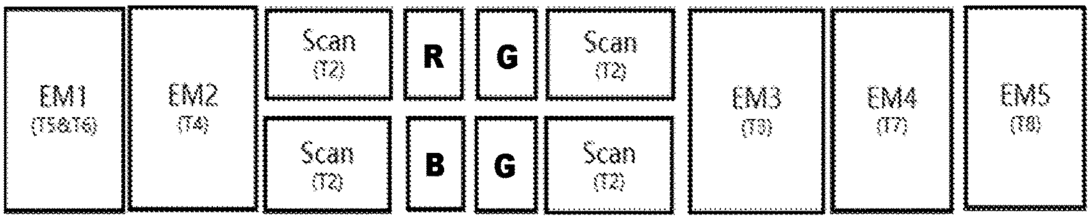
FIG. 6 is a schematic structural diagram of a display panel in which the pixel circuit shown in FIG. 4 is located.
Figure 7:
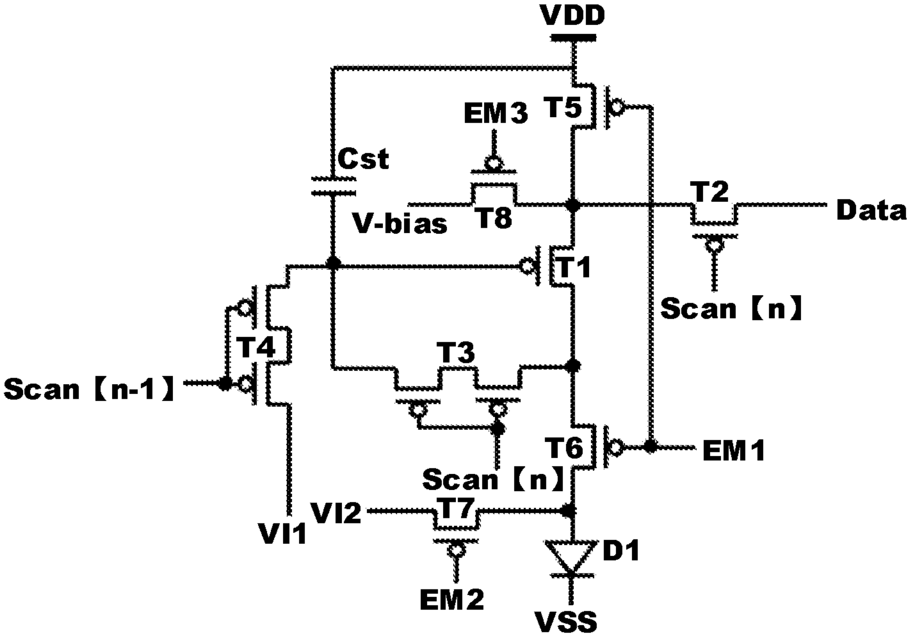
FIG. 7 is a schematic diagram of a second structure of a pixel circuit according to an embodiment of the present disclosure.
Figure 8:
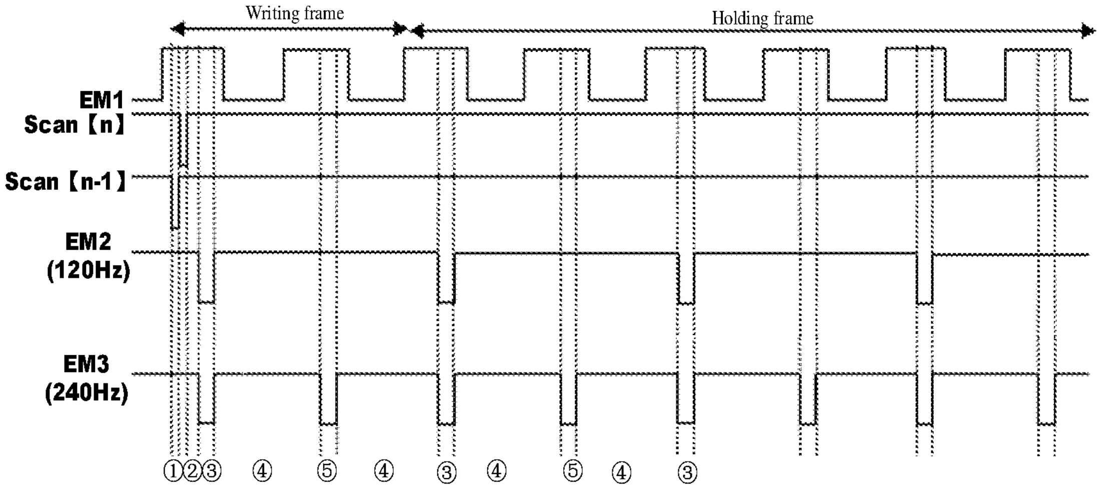
FIG. 8 is a timing diagram of the pixel circuit shown in FIG. 7.
Figure 9:
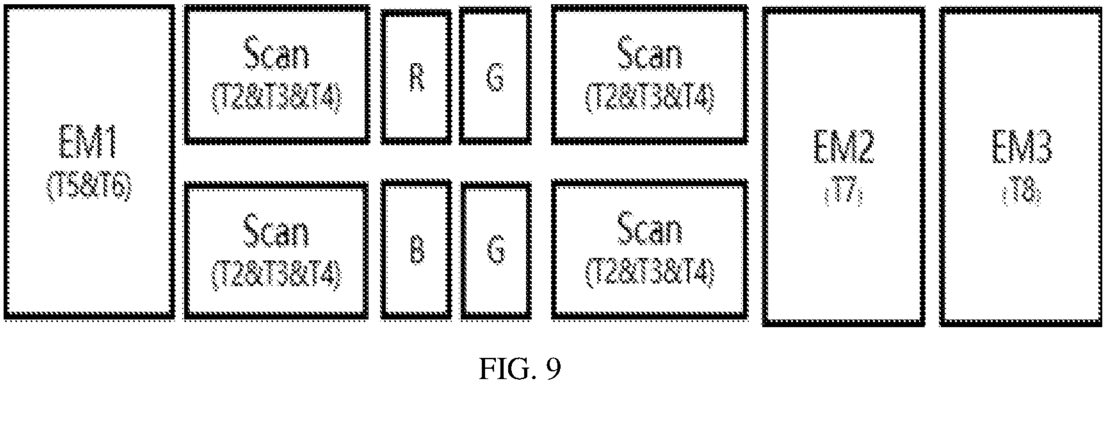
FIG. 9 is a schematic structural diagram of a display panel in which the pixel circuit shown in FIG. 7 is located.
Figure 10:
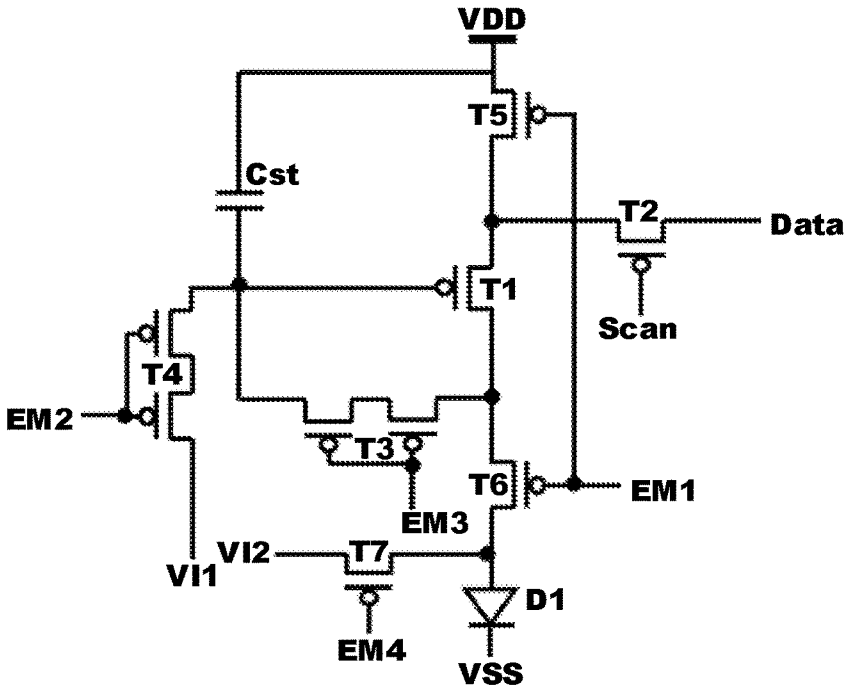
FIG. 10 is a schematic diagram of a third structure of a pixel circuit according to an embodiment of the present disclosure.

In view of the above-mentioned technical problem that the flicker at the low refresh frequency and the uniformity at low gray scale are difficult to be synchronously improved, the present embodiment provides a pixel circuit, referring to FIGS. 4 to 12. As shown in FIGS. 4, 7, and 10, the pixel circuit includes a first light-emitting control transistor T5, a driving transistor T1, a second light-emitting control transistor T6, and a light-emitting device D1, and one of a source or a drain of the first light-emitting control transistor T5 is electrically connected to a first power supply line; one of a source or a drain of the driving transistor T1 is electrically connected to another of the source or the drain of the first light-emitting control transistor T5; one of a source or a drain of the second light-emitting control transistor T6 is electrically connected to another of the source or the drain of the driving transistor T1; the anode of the light emitting device D1 is electrically connected to another of the source or the drain of the second light-emitting control transistor T6, and a cathode of the light emitting device D1 is electrically connected to a second power supply line. The number of times to reset the source or drain of the driving transistor T1 in one frame is greater than the number of times to reset the anode of the light emitting device D1 in one frame.

It may be understood that the pixel circuit according to the present embodiment may reduce a drift amplitude of a threshold voltage of the driving transistor T1 by resetting the potential of the source or the drain of the driving transistor T1, thereby improving the flicker phenomenon at the low refresh frequency. At the same time, the number of times to reset the source or drain of the driving transistor T1 in one frame is larger than the number of times to reset the anode of the light-emitting device D1 in one frame, so that the number of times to reset the anode of the light-emitting device D1 may be reduced, the number of repetitive charging of the anode of the light-emitting device D1 may be reduced, and the problem of insufficient charging of the anode potential of the light-emitting device D1 is improved, thereby improving the uniformity at the low gray scale.

It should be noted that a gate of the first light-emitting control transistor T5 and a gate of the second light-emitting control transistor T6 may share the same control line for transmitting the control signal EM1; each of the gate of the first light-emitting control transistor T5 and the gate of the second light-emitting control transistor T6 may be individually provided with a control line.

The first power supply line is used to transmit a positive power supply signal VDD, the second power supply line is used to transmit a negative power supply signal VSS, and a potential of the positive power supply signal VDD is higher than a potential of the negative power supply signal VSS.

The light-emitting device D1 may be an organic light-emitting diode, a micro light-emitting diode, a mini light-emitting diode, or a quantum dot light-emitting diode.

In an embodiment, as shown in FIGS. 4 and 7, the pixel circuit further includes a first reset transistor T7 and a bias transistor, one of the source or drain of the first reset transistor T7 is electrically connected to the anode of the light-emitting device D1, another of the source or the drain of the first reset transistor T7 is electrically connected to the first reset line, and a gate of the first reset transistor T7 is electrically connected to the first control line. One of the source or the drain of the bias transistor is electrically connected to the source or the drain of the driving transistor T1, another of the source or the drain of the bias transistor is electrically connected to a first wiring, and a gate of the bias transistor is electrically connected to the second wiring. One frame includes at least one first period and at least one second period. The first reset transistor T7 and the bias transistor are both turned on during the at least one first period. During the at least one second period, the first reset transistor T7 is turned off, and the bias transistor is turned on.

It may be understood that in the pixel circuit according to the present embodiment, the first reset transistor T7 and the bias transistor may be controlled separately by different control lines, both the first reset transistor T7 and the bias transistor may be controlled to be turned on in the first time period, and the first reset transistor T7 is controlled to be turned off and the bias transistor is controlled to be turned on in a second time period, so that the number of times to reset the source or drain of the driving transistor T1 in one frame is configured to be greater than the number of times to reset the anode of the light-emitting device D1 in one frame, the number of times to reset the anode of the light-emitting device D1 may be reduced, and the number of repetitive charging of the anode of the light-emitting device D1 may be reduced, thereby improving the problem of insufficient charging of the anode potential of the light-emitting device D1, and further improving the uniformity at the low gray scale.

Figure 11:
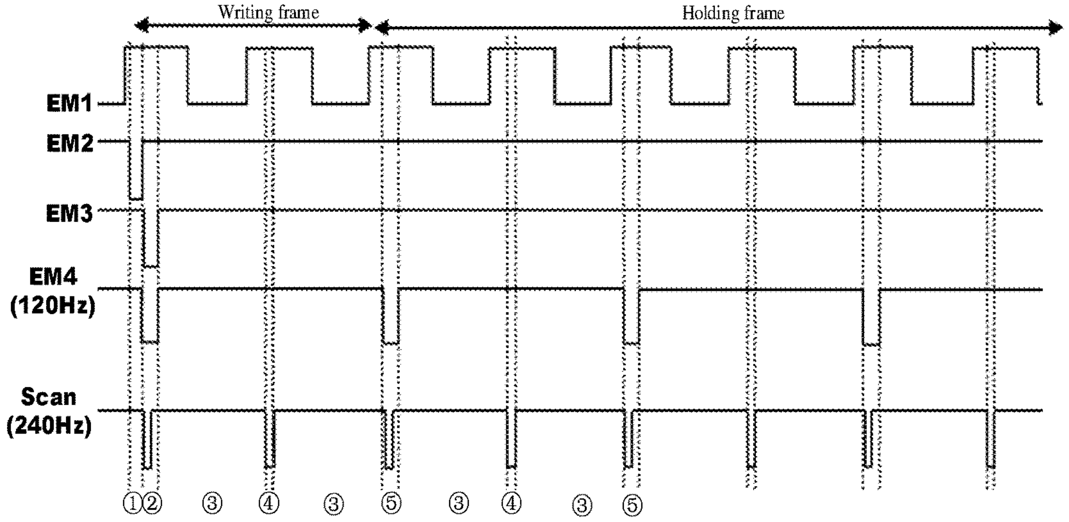
FIG. 11 is a timing diagram of the pixel circuit shown in FIG. 10.

It should be noted that the first period may be a stage ③ as shown in FIG. 5 or FIG. 8, and the second period may be a stage ⑤ as shown in FIG. 5. The first period may be a stage ② or a stage ⑤ as shown in FIG. 11, and the second period may be a stage ④ as shown in FIG. 11.

In an embodiment, as shown in FIGS. 4 and 7, the bias transistor is a second reset transistor T8, the first wiring is a second reset line, and the second wiring is a second control line. One of the source or drain of the second reset transistor T8 is electrically connected to the source or drain of the driving transistor T1, another of the source or drain of the second reset transistor T8 is electrically connected to the second reset line, and the gate of the second reset transistor T8 is electrically connected to the second control line.

It should be noted that in FIG. 4, the first reset line is used to transmit the first initialization signal VI2. The first control line is used to transmit the control signal EM4. The second reset line is used to transmit the bias voltage signal V-bias to reset the source or drain of the driving transistor T1. The second control line is used to transmit the control signal EM5.

It may be appreciated that in the pixel circuit according to the present embodiment, the first reset transistor T7 and the second reset transistor T8 may be controlled separately by different control lines, the number of times to reset the source or drain of the driving transistor T1 in one frame is configured to be greater than the number of times to reset the anode of the light-emitting device D1 in one frame, the number of times to reset the anode of the light-emitting device D1 may be reduced, and the number of repetitive charging of the anode of the light-emitting device D1 may be reduced, thereby improving the problem of insufficient charging of the anode potential of the light-emitting device D1, and further improving the uniformity at the low gray scale.

In an embodiment, as shown in FIGS. 4, 7, and 10, the pixel circuit further includes a storage capacitor Cst, one end of which is electrically connected to the gate of the driving transistor T1, and another end of which is electrically connected to the first power supply line.

In an embodiment, as shown in FIGS. 4, 7, and 10, the pixel circuit further includes a third reset transistor T4, one of a source or a drain of the third reset transistor T4 is electrically connected to the gate of the driving transistor T1, another of the source or the drain of the third reset transistor T4 is electrically connected to a third reset line, and a gate of the third reset transistor T4 is electrically connected to the fifth control line.

It should be noted that the third reset line is used to transmit the second initialization signal VI1. The fifth control line is used to transmit the control signal EM2 in FIG. 4.

The third reset transistor T4 may be formed by connecting two low-temperature polysilicon thin film transistors in series, so that the dynamic performance may be improved, and the leakage current of the driving transistor T1 may be reduced.

In an embodiment, as shown in FIGS. 4, 7 and 10, the pixel circuit further includes a compensation transistor T3, one of a source or a drain of the compensation transistor T3 is electrically connected to the gate of the driving transistor T1, another of the source or the drain of the compensation transistor T3 is electrically connected to the other of the source or the drain of the driving transistor T1, and the gate of the compensation transistor T3 is electrically connected to a fourth control line.

It should be noted that the fourth control line is used to transmit the control signal EM3 in FIG. 4.

The compensation transistor T3 may be formed by two low-temperature polysilicon thin film transistors in series, so that the dynamic performance may be improved and the leakage current of the driving transistor T1 may be reduced.

In an embodiment, as shown in FIGS. 4 and 7, the pixel circuit further includes a writing transistor T2, one of a source or a drain of the writing transistor T2 is electrically connected to one of the source or drain of the driving transistor T1, another of the source or the drain of the writing transistor T2 is electrically connected to the data line, and a gate of the writing transistor T2 is electrically connected to a third control line.

It should be noted that the third control line is used to transmit the scanning signal Scan in FIG. 4.

The operation process of the pixel circuit shown in FIG. 4 in one frame is shown in FIG. 5, which includes the following driving process.

1). Writing Frame

At a stage ①, the control signal EM1 is at a high level, and the first light-emitting control transistor T5 and the second light-emitting control transistor T6 are turned off; the control signal EM2 is at a low level, the third reset transistor T4 is turned on, and the second initialization signal VI1 resets the gate of the driving transistor T1.

At a stage ②, the scanning signal Scan is at a low level, and the writing transistor T2 is turned on; the control signal EM3 is at a low level, the compensation transistor T3 is turned on, and the data signal Data is written to the gate of the driving transistor T1 and the storage capacitor Cst.

At a stage ③, the control signal EM4 and the control signal EM5 are both at a low level, and the first reset transistor T7 and the second reset transistor T8 are turned on; the first initialization signal VI2 resets the anode of the light-emitting device D1, and the bias voltage signal V-bias is applied to the source and drain of the driving transistor T1, thereby improving the hysteresis of the driving transistor T1 and improving the flicker at the low frequency.

At a stage ④, the control signal EM1 is at a low level, the first light-emitting control transistor T5 and the second light-emitting control transistor T6 are turned on, and the light-emitting device D1 emits light.

At a stage ⑤, the control signal EM5 is at a low level, the second reset transistor T8 is turned on, and the bias voltage signal V-bias resets the source and drain of the driving transistor T1.

2). Holding Frame

The stage ③, the stage ④, and the stage ⑤ are repeatedly written in the frame.

Specifically, the frequency of the control signal EM5 may be two times as large as the frequency of the control signal EM4. For example, the frequency of the control signal EM5 may be 240 Hz, and the frequency of the control signal EM4 may be 120 Hz.

FIG. 6 is a schematic structural diagram of a display panel in which the pixel circuit shown in FIG. 4 is located. The display panel includes a pixel circuit for red color (R) light emitting, a pixel circuit for green color (G) light emitting, and a pixel circuit for blue color (B) light emitting in a display area, which may be arranged in the display area in an array. The display panel also includes a plurality of gate driving circuits in a non-display area to provide various signals required for respective pixel circuits.

For example, a first gate driving circuit, a second gate driving circuit, a third gate driving circuit, a fourth gate driving circuit, and a fifth gate driving circuit may sequentially supply the control signal EM1, the control signal EM2, the control signal EM3, the control signal EM4, and the control signal EM5 to respective pixel circuits, respectively. A sixth gate driving circuit and a seventh gate driving circuit distributed on both sides of the display area may supply the same scanning signal Scan to the same scanning line to improve the driving capability of the scanning signal Scan by double-side driving.

In comparison with the pixel circuit shown in FIG. 4, in FIG. 7, a gate of a writing transistor T2 and a gate of a compensation transistor T3 share the same third control line. A first control line is used to transmit a control signal EM2. A second control line is used to transmit a control signal EM3. The third control line is used to transmit the scanning signal Scan [n]. A fifth control line is used to transmit the scanning signal Scan [n−1].

The operation process of the pixel circuit shown in FIG. 7 in one frame is shown in FIG. 8, which includes the following driving process.

1). Writing Frame

At a stage ①, the control signal EM1 is at a high level, and the first light-emitting control transistor T5 and the second light-emitting control transistor T6 are turned off; the scanning signal Scan [n−1] is at a low level, the third reset transistor T4 is turned on, and the second initialization signal VI1 resets the gate of the driving transistor T1.

At a stage ②, the scanning signal Scan [n] is at a low level, the writing transistor T2 and the compensation transistor T3 are turned on, and the data signal Data is written to the gate of the driving transistor T1 and the storage capacitor Cst.

At a stage ③, the control signal EM2 and the control signal EM3 are both at a low level, and the first reset transistor T7 and the second reset transistor T8 are turned on; the first initialization signal VI2 resets the anode of the light-emitting device D1, and the bias voltage signal V-bias is applied to the source and drain of the driving transistor T1, thereby improving the hysteresis of the driving transistor T1 and improving the flicker at the low frequency.

At a stage ④, the control signal EM1 is at a low level, the first light-emitting control transistor T5 and the second light-emitting control transistor T6 are turned on, and the light-emitting device D1 emits light.

At a stage ⑤, the control signal EM3 is at a low level, the second reset transistor T8 is turned on, and the bias voltage signal V-bias resets the source and drain of the driving transistor T1.

2k). Holding Frame

The stage ③, the stage ④, and the stage ⑤ are repeatedly written in the frame.

Specifically, the frequency of the control signal EM3 may be two times as large as the frequency of the control signal EM2. For example, the frequency of the control signal EM3 may be 240 Hz, and the frequency of the control signal EM2 may be 120 Hz.

FIG. 9 is a schematic structural diagram of a display panel in which the pixel circuit shown in FIG. 7 is located. The display panel includes a pixel circuit for red color (R) light emitting, a pixel circuit for green color (G) light emitting, and a pixel circuit for blue color (B) light emitting in a display area, which may be arranged in the display area in an array. The display panel also includes a plurality of gate driving circuits in a non-display area to provide various signals required for respective pixel circuits.

For example, a first gate driving circuit, a second gate driving circuit, and a third gate driving circuit may sequentially supply the control signal EM1, the control signal EM2, and the control signal EM3 to respective pixel circuits, respectively. Fourth gate driving circuits and fifth gate driving circuits distributed on both sides of the display area may supply the same scanning signal Scan [n] to the same scanning line and supply the same scanning signal Scan [n−1] to the same scanning line, so as to improve the driving capability of the two scanning signals by double-side driving.

It may be appreciated that since the scan signal Scan [n] and the scan signal Scan [n−1] may be provided through the fourth gate driving circuit and the fifth gate driving circuit without other gate driving circuits, the number of gate driving circuits is reduced, facilitating the implementation of narrower bezel.

At the same time, since the gate of the compensation transistor T3 and the gate of the writing transistor T2 share the same third control line, the number of wirings in the display area or the area of the wirings is reduced, and it is advantageous to increase the density of the pixel circuits or the aperture rate of the display panel.

In an embodiment, referring to FIGS. 4 to 9, the number of times the second reset transistor T8 is turned on in one frame is greater than the number of times the first reset transistor T7 is turned on in one frame.

It should be noted that in the present embodiment, the anode of the light-emitting device D1 may be reset once every time the first reset transistor T7 is turned on, and the source and/or drain of the driving transistor T1 may be reset once every time the second reset transistor T8 is turned on.

In an embodiment, one frame includes a writing frame and a holding frame, the number of times the second reset transistor T8 is turned on in the writing frame is greater than the number of times the first reset transistor T7 is turned on in the writing frame, and the number of times the second reset transistor T8 is turned on in the holding frame is greater than the number of times the first reset transistor T7 is turned on in the holding frame.

It should be noted that in the present embodiment, the number of times the first reset transistor T7 is turned on is configured to be less in the holding frame, so that the number of times to reset the anode of the light-emitting device D1 may be reduced, and the number of charges and discharges of the anode of the light-emitting device D1 may be reduced, thereby facilitating improvement of display uniformity at the low gray scale.

In an embodiment, the first control line is used to transmit a first control signal and the second control line is used to transmit a second control signal, the number of pulses of the second control signal in one frame is greater than the number of pulses of the first control signal in one frame.

It should be noted that in the present embodiment, the first control signal may be the control signal EM4 in FIGS. 4 to 6 or the control signal EM2 in FIGS. 7 to 9. The second control signal may be the control signal EM5 in FIGS. 4 to 6 or the control signal EM3 in FIGS. 7 to 9.

In an embodiment, one frame includes a writing frame and a holding frame, the number of pulses in the writing frame of the second control signal is greater than the number of pulses in the writing frame of the first control signal, and the number of pulses in the holding frame of the second control signal is greater than the number of pulses in the holding frame of the first control signal.

It should be noted that each pulse of the first control signal may turn on the first reset transistor T7 once to reset the anode potential of the light-emitting device D1. Each pulse of the second control signal may turn on the second reset transistor T8 once to reset the source or the drain of the driving transistor T1.

Figure 12:
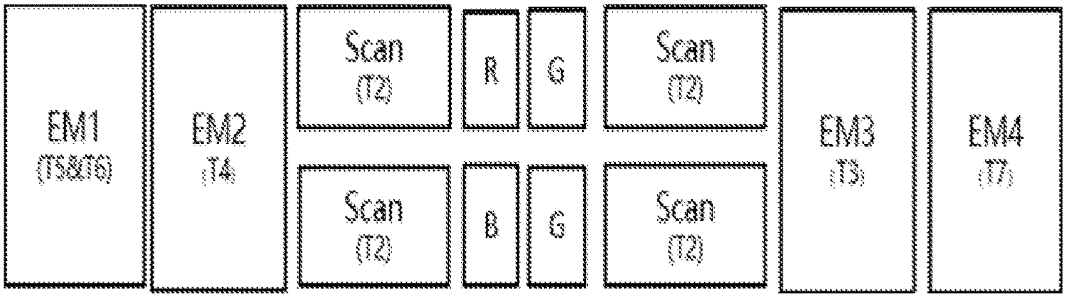
FIG. 12 is a schematic structural diagram of a display panel in which the pixel circuit shown in FIG. 10 is located.

In an embodiment, referring to FIGS. 10 to 12, as shown in FIGS. 10 and 11, a bias transistor is a writing transistor T2, a first wiring is a data line, and a second wiring is a third control line; one of a source or a drain of the writing transistor T2 is electrically connected to a source or a drain of the driving transistor T1, another of the source or the drain of the writing transistor T2 is electrically connected to the data line, and a gate of the writing transistor T2 is electrically connected to the third control line; the number of times the writing transistor T2 is turned on in one frame is greater than the number of times the first reset transistor T7 is turned on in one frame.

It should be noted that, it may be understood that in the pixel circuit according to the present embodiment, by individually controlling the first reset transistor T7 and the writing transistor T2, the number of times to reset the source or drain of the driving transistor T1 in one frame is configured to be larger than the number of times to reset the anode of the light-emitting device D1 in one frame, the number of times to reset the anode of the light-emitting device D1 may be reduced, and the number of repetitive charging of the anode of the light-emitting device D1 may be reduced, thereby improving the problem of insufficient charging of the anode potential of the light-emitting device D1, and further improving the uniformity at the low gray scale.

In addition, in the present embodiment, the writing transistor T2 is multiplexed to reset the source and/or the drain of the driving transistor T1, so that not only the number of transistors required by the pixel circuit is reduced, but also the area occupied by the pixel circuit may be reduced, thereby increasing the density of the pixel circuit in the display area.

In comparison with the pixel circuit shown in FIG. 7, in FIG. 10, the first control line is used to transmit the control signal EM4. The third control line is used to transmit the scanning signal Scan. The fourth control line is used to transmit the control signal EM3. The fifth control line is used to transmit the control signal EM2.

The operation process of the pixel circuit shown in FIG. 10 in one frame is shown in FIG. 11, which includes the following driving process.

1). Writing Frame

At a stage ①, the control signal EM1 is at a high level, and the first light-emitting control transistor T5 and the second light-emitting control transistor T6 are turned off; the control signal EM2 is at a low level, the third reset transistor T4 is turned on, and the second initialization signal VI1 resets the gate of the driving transistor T1.

At a stage ②, the control signal EM4 is at a low level, the first reset transistor T7 is turned on, and the first initialization signal VI2 resets the anode of the light-emitting device D1; the scanning signal Scan is at a low level, the writing transistor T2 is turned on, the control signal EM3 is at a low level, the compensation transistor T3 is turned on, and the data signal Data is written to the gate of the driving transistor T1 and the storage capacitor Cst.

At a stage ③, the control signal EM1 is at a low level, the first light-emitting control transistor T5 and the second light-emitting control transistor T6 are turned on, and the light-emitting device D1 emits light.

At a stage ④, the control signal EM1 is at a high level, and the first light-emitting control transistor T5 and the second light-emitting control transistor T6 are turned off; the scanning signal Scan is at a low level, the second reset transistor T8 is turned on, and the bias voltage signal V-bias resets the source and drain of the driving transistor T1.

At a stage ⑤, the control signal EM4 is at a low level, the first reset transistor T7 is turned on, and the first initialization signal VI2 resets the anode of the light-emitting device D1; the scanning signal Scan is at a low level, the second reset transistor T8 is turned on, and the bias voltage signal V-bias resets the source and drain of the driving transistor T1.

2). Holding Frame

The stage ③, the stage ④, and the stage ⑤ are repeatedly written in the frame.

Specifically, the frequency of the scanning signal Scan may be two times as large as the frequency of the control signal EM4. For example, the frequency of the scanning signal Scan may be 240 Hz, and the frequency of the control signal EM4 may be 120 Hz.

FIG. 12 is a schematic structural diagram of a display panel in which the pixel circuit shown in FIG. 10 is located. The display panel includes a pixel circuit for red color (R) light emitting, a pixel circuit for green color (G) light emitting, and a pixel circuit for blue color (B) light emitting in a display area, which may be arranged in the display area in an array. The display panel also includes a plurality of gate driving circuits in a non-display area to provide various signals required for respective pixel circuits.

For example, a first gate driving circuit, a second gate driving circuit, a third gate driving circuit, and a fourth gate driving circuit may sequentially supply the control signal EM1, the control signal EM2, the control signal EM3, and the control signal EM4 to respective pixel circuits, respectively. A fifth gate driving circuit and a sixth gate driving circuit distributed on both sides of the display area may supply the same scanning signal Scan to the same scanning line to improve the driving ability of the two scanning signals by double-side driving.

In an embodiment, referring to FIGS. 10 to 12, one frame includes a writing frame and a holding frame, the number of times the writing transistor T2 is turned on in the writing frame is greater than the number of times the first reset transistor T7 is turned on in the writing frame, and the number of times the writing transistor T2 is turned on in the holding frame is greater than the number of times the first reset transistor T7 is turned on in the holding frame.

It should be noted that a first turn-on of the writing transistor T2 in the writing frame is to write the data signal Data to the gate of the driving transistor T1, and a second turn-on of the writing transistor T2 in the writing frame is to reset the source and drain of the driving transistor T1 using the low potential of the data signal Data. Each turn-on of the writing transistor T2 in the holding frame is to reset the source and drain of the driving transistor T1.

In an embodiment, the first control line is used to transmit a first control signal, the third control line is used to transmit a third control signal, the number of pulses of the third control signal in one frame is greater than the number of pulses of the first control signal in one frame.

It should be noted that as shown in FIGS. 10 to 12, the first control signal may be the control signal EM4. The third control signal may be the scanning signal Scan.

In an embodiment, the data line is used to transmit a data signal Data, the number of pulses of the third control signal in the writing frame is greater than the number of pulses of the first control signal in the writing frame, and the data signal Data has at least one pulse in the writing frame; the number of pulses of the third control signal in the holding frame is greater than the number of pulses of the first control signal in the holding frame, and the number of pulses of the data signal Data in the holding frame is zero.

It should be noted that in the present embodiment, each of the pulses of the first control signal may turn on the first reset transistor T7 once, and each of the pulses of the third control signal may turn on the writing transistor T2 once.

It should be noted that at least one of the first reset transistor T7, the second reset transistor T8, the third reset transistor T4, the compensation transistor T3, the writing transistor T2, the driving transistor T1, the first light-emitting control transistor T5, and the second light-emitting control transistor T6 may be a low-temperature polysilicon thin film transistor, and/or may be an oxide thin film transistor.

In an embodiment, the present embodiment provides a display panel including a plurality of pixel circuits in at least one of the above-described embodiments and at least two gate driving circuits, one of the gate driving circuits outputs a first driving signal to control the source or drain of the driving transistor T1 to reset, and another of the gate driving circuits outputs a second driving signal to control the anode of the light-emitting device D1 to reset; a frequency of the first driving signal is higher than that of the second driving signal.

It may be appreciated that since the display panel provided in this embodiment includes a plurality of pixel circuits in at least one of the above-described embodiments, it is also possible to reduce the drift amplitude of the threshold voltage of the driving transistor T1 by resetting the potential of the source or the drain of the driving transistor T1, thereby improving the flicker phenomenon at the low refresh frequency. At the same time, the number of times to reset the source or drain of the driving transistor T1 in one frame is larger than the number of times to reset the anode of the light-emitting device D1 in one frame, so that the number of times to reset the anode of the light-emitting device D1 may be reduced, the number of repetitive charging of the anode of the light-emitting device D1 may be reduced, and the problem of insufficient charging of the anode potential of the light-emitting device D1 is improved, thereby improving the uniformity at the low gray scale.

It should be noted that the first driving signal may be the control signal EM5 in FIGS. 4 and 5, and the second driving signal may be the control signal EM4 in FIGS. 4, 5 and 6; alternatively, the first driving signal may be the control signal EM3 in FIGS. 7 and 8, and the second driving signal may be the control signal EM2 in FIGS. 7, 8 and 9; alternatively, the first driving signal may be the scanning signal Scan in FIGS. 10, 11, and 12, and the second driving signal may be the control signal EM4 in FIGS. 10, 11, and 12.

It may be understood that, for those ordinary skilled in the art, equivalent replacements or changes may be made according to the technical solutions and inventive concepts of the present disclosure, and all such changes or replacements should fall within the protection scope of the claims appended to the present disclosure.

What is claimed is:

1. A pixel circuit comprising:

a first light-emitting control transistor, one of a source or a drain of the first light-emitting control transistor being electrically connected to a first power supply line;

a driving transistor, one of a source or a drain of the driving transistor being electrically connected to another of the source or the drain of the first light-emitting control transistor;

a second light-emitting control transistor, one of a source or a drain of the second light-emitting control transistor being electrically connected to another of the source or the drain of the driving transistor;

a light-emitting device, an anode of the light-emitting device being electrically connected to another of the source or the drain of the second light-emitting control transistor, and a cathode of the light-emitting device being electrically connected to a second power supply line;

a first reset transistor, one of a source or a drain of the first reset transistor being electrically connected to the anode of the light-emitting device, another of the source or the drain of the first reset transistor being electrically connected to a first reset line, and a gate of the first reset transistor being electrically connected to a first control line; and a bias transistor, one of a source or a drain of the bias transistor being electrically connected to the source or the drain of the driving transistor, another of the source or the drain of the bias transistor being electrically connected to a first wiring, and a gate of the bias transistor being electrically connected to a second wiring;

wherein a number of times the source or drain of the driving transistor is reset in one frame is greater than a number of times the anode of the light-emitting device is reset in the one frame; the one frame comprises at least one first period and at least one second period; during the at least one first period, both the first reset transistor and the bias transistor are turned on; and during the at least one second period, the first reset transistor is turned off, and the bias transistor is turned on;

wherein in a condition that the bias transistor is a second reset transistor, the one frame comprises a writing frame and a holding frame, a number of times the second reset transistor is turned on in the writing frame is greater than a number of times the first reset transistor is turned on in the writing frame, and a number of times the second reset transistor is turned on in the holding frame is greater than a number of times the first reset transistor is turned on in the holding frame.

2. The pixel circuit according to claim 1, wherein the first wiring is a second reset line, and the second wiring is a second control line; one of a source or a drain of the second reset transistor is electrically connected to the source or the drain of the driving transistor, another of the source or the drain of the second reset transistor is electrically connected to the second reset line, and a gate of the second reset transistor is electrically connected to the second control line, and wherein a number of times the second reset transistor is turned on in the one frame is greater than a number of times the first reset transistor is turned on in the one frame.

3. The pixel circuit according to claim 2, wherein the first control line is configured to transmit a first control signal, and the second control line is configured to transmit a second control signal, a number of pulses of the second control signal in the one frame is greater than a number of pulses of the first control signal in the one frame.

4. The pixel circuit according to claim 3, wherein the one frame comprises a writing frame and a holding frame, a number of pulses of the second control signal in the writing frame is greater than a number of pulses of the first control signal in the writing frame, and a number of pulses of the second control signal in the holding frame is greater than a number of pulses of the first control signal in the holding frame.

5. The pixel circuit according to claim 1, wherein in a condition that the bias transistor is a writing transistor, the first wiring is a data line, and the second wiring is a third control line; one of a source or a drain of the writing transistor is electrically connected to the source or the drain of the driving transistor, another of the source or the drain of the writing transistor is electrically connected to the data line, and a gate of the writing transistor is electrically connected to the third control line, and wherein a number of times the writing transistor is turned on in the one frame is greater than a number of times the first reset transistor is turned on in the one frame.

6. The pixel circuit according to claim 5, wherein the one frame comprises a writing frame and a holding frame, a number of times the writing transistor is turned on in the writing frame is greater than a number of times the first reset transistor is turned on in the writing frame, and a number of times the writing transistor is turned on in the holding frame is greater than a number of times the first reset transistor is turned on in the holding frame.

7. The pixel circuit according to claim 5, wherein the first control line is configured to transmit a first control signal, and the third control line is configured to transmit a third control signal, a number of pulses of the third control signal in the one frame is greater than a number of pulses of the first control signal in the one frame.

8. The pixel circuit according to claim 7, wherein the data line is configured to transmit a data signal, the one frame comprises a writing frame and a holding frame, a number of pulses of the third control signal in the writing frame is greater than a number of pulses of the first control signal in the writing frame, the data signal comprises at least one pulse in the writing frame; and a number of pulses of the third control signal in the holding frame is greater than a number of pulses of the first control signal in the holding frame, and a number of pulses of the data signal in the holding frame is zero.

9. A display panel comprising:

a plurality of pixel circuits according to claim 1; and at least two gate driving circuits, one of the gate driving circuits outputting a first driving signal to control the source or the drain of the driving transistor to reset; wherein another of the gate driving circuits outputs a second driving signal to control the anode of the light-emitting device to reset, wherein a frequency of the first driving signal is higher than a frequency of the second driving signal.

10. The display panel according to claim 9, wherein the first wiring is a second reset line, and the second wiring is a second control line; one of a source or a drain of the second reset transistor is electrically connected to the source or the drain of the driving transistor, another of the source or the drain of the second reset transistor is electrically connected to the second reset line, and a gate of the second reset transistor is electrically connected to the second control line, and wherein a number of times the second reset transistor is turned on in the one frame is greater than a number of times the first reset transistor is turned on in the one frame.

11. The display panel according to claim 10, wherein the first control line is configured to transmit a first control signal, and the second control line is configured to transmit a second control signal, a number of pulses of the second control signal in the one frame is greater than a number of pulses of the first control signal in the one frame.

12. The display panel according to claim 11, wherein the one frame comprises a writing frame and a holding frame, a number of pulses of the second control signal in the writing frame is greater than a number of pulses of the first control signal in the writing frame, and a number of pulses of the second control signal in the holding frame is greater than a number of pulses of the first control signal in the holding frame.

13. The display panel according to claim 9, wherein in a condition that the bias transistor is a writing transistor, the first wiring is a data line, and the second wiring is a third control line; one of a source or a drain of the writing transistor is electrically connected to the source or the drain of the driving transistor, another of the source or the drain of the writing transistor is electrically connected to the data line, and a gate of the writing transistor is electrically connected to the third control line, and wherein a number of times the writing transistor is turned on in the one frame is greater than a number of times the first reset transistor is turned on in the one frame.

14. The display panel according to claim 13, wherein the one frame comprises a writing frame and a holding frame, a number of times the writing transistor is turned on in the writing frame is greater than a number of times the first reset transistor is turned on in the writing frame, and a number of times the writing transistor is turned on in the holding frame is greater than a number of times the first reset transistor is turned on in the holding frame.

15. The display panel according to claim 13, wherein the first control line is configured to transmit a first control signal, and the third control line is configured to transmit a third control signal, a number of pulses of the third control signal in the one frame is greater than a number of pulses of the first control signal in the one frame.

16. The display panel according to claim 15, wherein the data line is configured to transmit a data signal, the one frame comprises a writing frame and a holding frame, a number of pulses of the third control signal in the writing frame is greater than a number of pulses of the first control signal in the writing frame, the data signal comprises at least one pulse in the writing frame; and a number of pulses of the third control signal in the holding frame is greater than a number of pulses of the first control signal in the holding frame, and a number of pulses of the data signal in the holding frame is zero.

17. A display panel comprising:

a plurality of pixel circuits, each comprising:

a first light-emitting control transistor, one of a source or a drain of the first light-emitting control transistor being electrically connected to a first power supply line;

a driving transistor, one of a source or a drain of the driving transistor being electrically connected to another of the source or the drain of the first light-emitting control transistor;

a second light-emitting control transistor, one of a source or a drain of the second light-emitting control transistor being electrically connected to another of the source or the drain of the driving transistor; and a light-emitting device, an anode of the light-emitting device being electrically connected to another of the source or the drain of the second light-emitting control transistor, and a cathode of the light-emitting device being electrically connected to a second power supply line; and at least two gate driving circuits, one of the gate driving circuits outputting a first driving signal to control the source or the drain of the driving transistor to reset; wherein another of the gate driving circuits outputs a second driving signal to control the anode of the light-emitting device to reset, wherein a frequency of the first driving signal is higher than a frequency of the second driving signal;

wherein a number of times the source or drain of the driving transistor is reset in one frame is greater than a number of times the anode of the light-emitting device is reset in the one frame.

* * * * *